United States Patent
Punathil (10) Patent No.: US 11,537,678 B1
(45) Date of Patent: Dec. 27, 2022

(54) FAST-TRACKING OF WEB REQUESTS USING A REQUEST DIGEST

(71) Applicant: International Business Machines Corporation, Armonk, NY (US)

(72) Inventor: Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/462,097

(22) Filed: Aug. 31, 2021

(51) Int. Cl.
- G06F 16/9535 (2019.01)
- G06F 16/957 (2019.01)
- G06F 16/9536 (2019.01)
- G06F 16/9538 (2019.01)

(52) U.S. Cl.
CPC ...... *G06F 16/9535* (2019.01); *G06F 16/9574* (2019.01); *G06F 16/9536* (2019.01); *G06F 16/9538* (2019.01)

(58) Field of Classification Search
CPC ............ G06F 16/9535; G06F 16/9574; G06F 16/9536; G06F 16/9538
See application file for complete search history.

(56) References Cited

U.S. PATENT DOCUMENTS

| | | | |
|---|---|---|---|
| 8,694,609 B2 | 4/2014 | Knittel | |
| 8,964,757 B2 | 2/2015 | Watson | |
| 9,405,555 B2 | 8/2016 | Livshits | |
| 10,972,573 B1 | 4/2021 | Lepeska | |
| 2017/0085555 A1* | 3/2017 | Bisikalo | G06F 3/0619 |
| 2017/0192884 A1* | 7/2017 | Ataras | G06F 8/65 |
| 2018/0288089 A1* | 10/2018 | Manthena | G06F 21/564 |
| 2020/0358858 A1* | 11/2020 | Shribman | H04L 63/1466 |

* cited by examiner

*Primary Examiner* — Alford W Kindred
*Assistant Examiner* — Lin Lin M Htay
(74) *Attorney, Agent, or Firm* — David B. Woycechowsky (57) ABSTRACT

Computer technology for fast-tracking requests, short-circuiting the current activity, long-jumping to a leading transaction that matches the current request type, comparing requests by converting them into a hash digest, using that digest for performing the fast-tracking and long-jumping.

6 Claims, 5 Drawing Sheets

FAST-TRACKING OF WEB REQUESTS USING A REQUEST DIGEST

BACKGROUND

The present invention relates generally to the field of web requests. It is understood in the art that it is generally better to respond to web requests, which can come in at a very high rate, in a manner that is as fast as feasible and as efficient with respect to computing resources as possible.

When computers communicate over a network (for example, the internet), then one computer (for example, a client device in the form of a laptop of an end user) may make a "request" (for example, a "web request" for requests made over the internet). The request is typically communicated to a second computer (for example, a server computer) on the network. One common example of this would be when a person uses their smartphone to request a web page generated by a weather forecasting entity that shows a current weather forecast for the local area. Another familiar example occurs when a user requests that a file be stored in a cloud based data storage system—if the request is accepted then a copy of the file can be transferred through the network in order to be stored in a cloud. Another example of a request is a paid subscriber who wants to stream music from a streaming music service—the request to log in to and authenticate with the music streaming service is a web request. Web clients communicate with web servers through a web request. For example, when a user clicks a link on a web page, submits a form, or runs a search, the browser sends a web request to the server.

SUMMARY

According to an aspect of the present invention, there is a method, computer program product and/or system that performs the following operations (not necessarily in the following order): (i) receiving a plurality of requests; (ii) fast-tracking at least some of the plurality of requests to obtain a plurality of fast-tracked requests; (iii) converting the requests of the plurality of fast-tracked requests into a hash digest; (iv) comparing the fast-tracked requests of the plurality of fast-tracked requests using that digest for performing the fast-tracking and long-jumping; (v) short-circuiting a current activity using the hash digest; and (vi) long-jumping to a leading transaction that matches a current request type.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
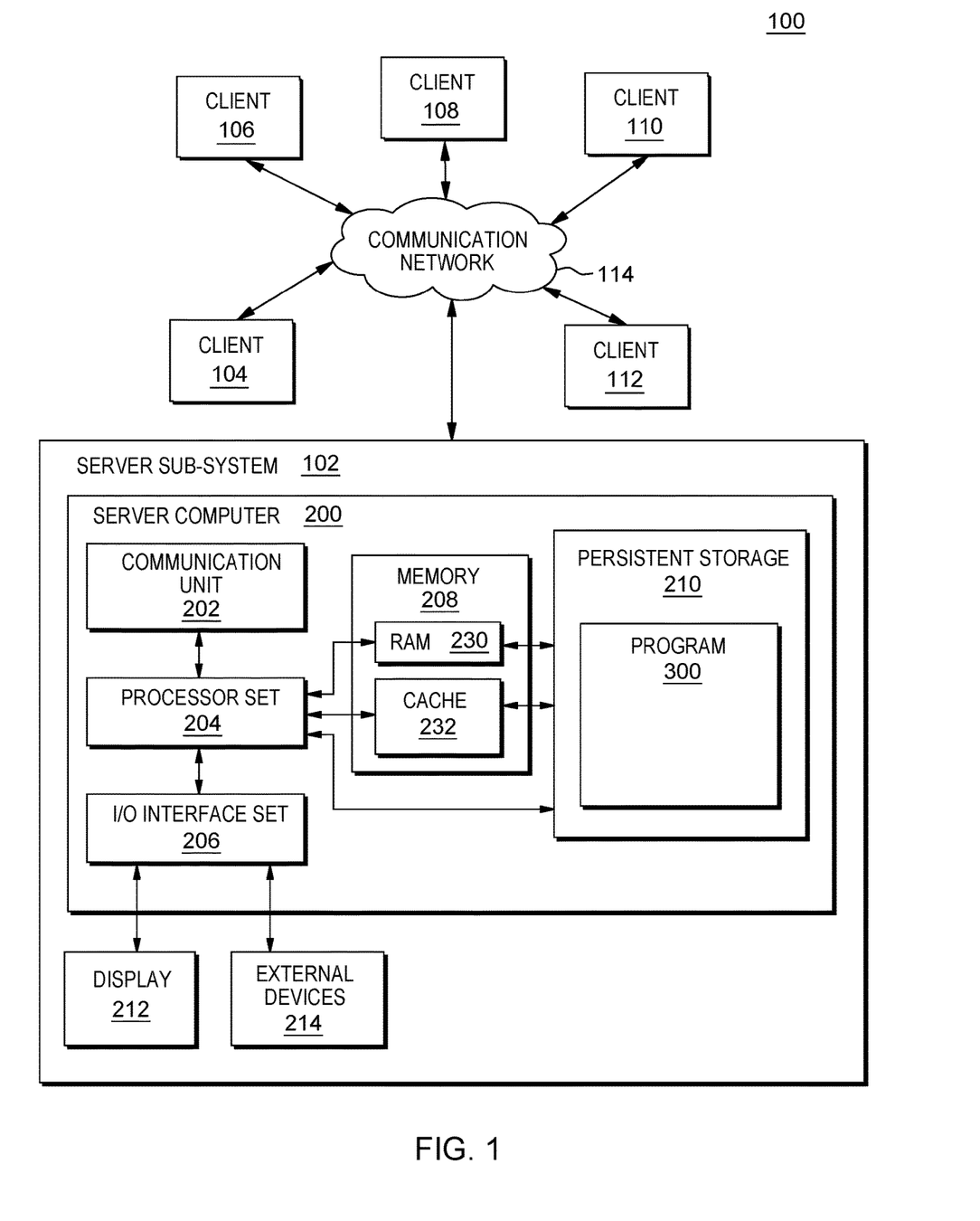
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

As the term "request digests" is used herein, it is hereby defined as a request digest that is defined, created, used and interpreted for a different purpose than conventional "request digests"—more specifically, the purpose of the type of "request digests" disclosed and used in this document is to facilitate correlation of different requests of the same nature, and take optimization decisions based on similarities. In the preceding sentence, "same nature" means the same intent as expressed in the web request. For example, a hundred clients from different parts of the world accessing the home page of "www.searchengine.com"—the intent is the same (web search), and hence, the "essence" of the request will be the same. The differences will be: (i) the IP address of the actual requesting system; and (ii) the granular time stamp of the request.

Figure 2:
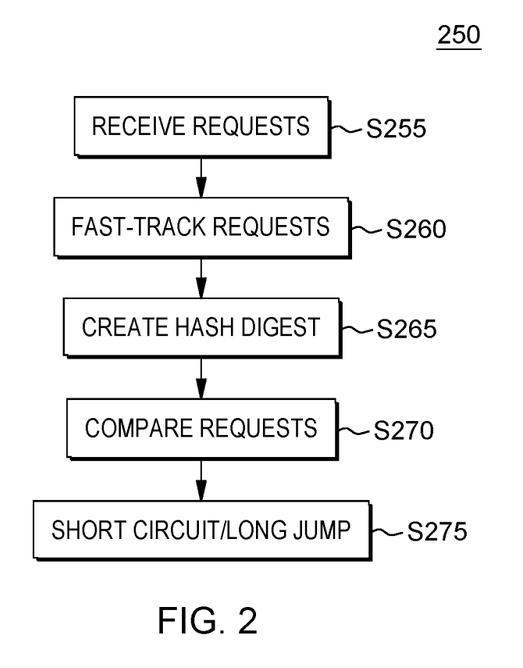
FIG. 2 is a flowchart showing a first embodiment method performed, at least in part, by the first embodiment system.
Figure 3:
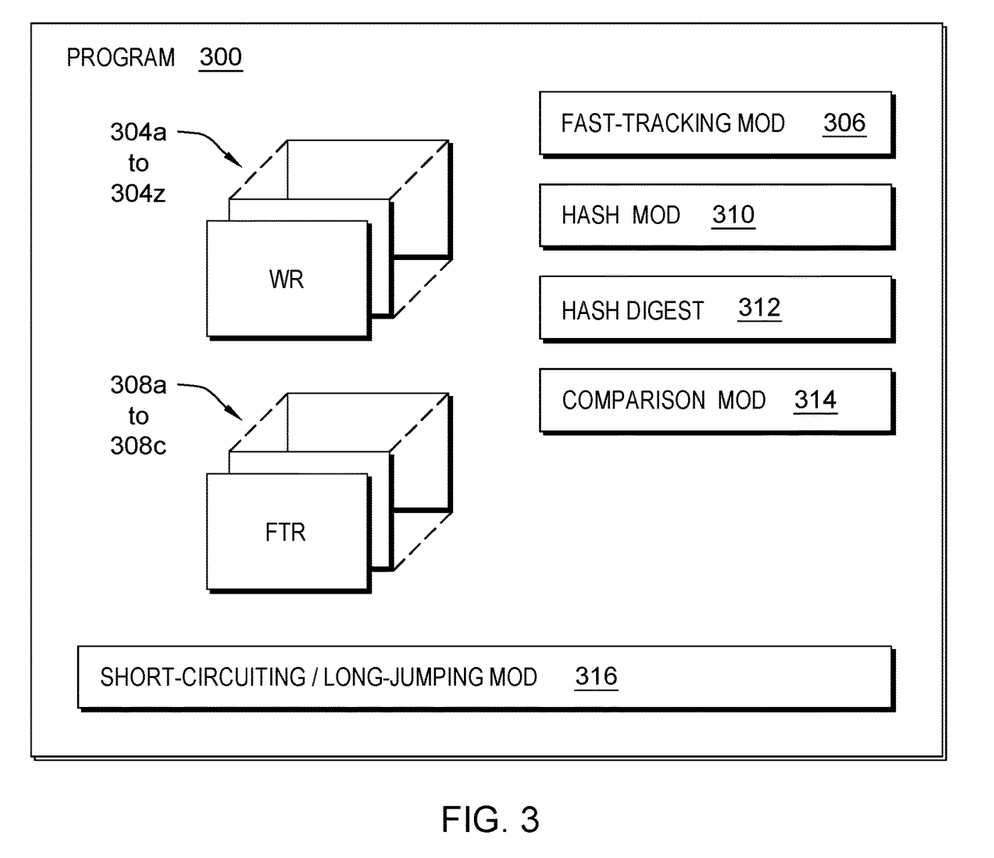
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive a plurality of web requests 304a to 304z from various client subsystems 104, 106, 108, 110, 112 is performed.

Processing proceeds to operation S260, where fast-tracking module ("mod") 306 selects some of plurality of requests 304a to 304z for fast-track processing treatment to obtain a plurality of fast-tracked requests 308a, 308b and 308c.

Processing proceeds to operation S265, where hash mod 310 converts a plurality of fast-tracked requests 308a, b, c into hash digest 312. A request digest is an encoding of the data pertinent to a web request. A request digest is defined as a "hash" of all the static part of the request. (Hundreds of web requests may be similar, but due to the dynamic part of the request such as client's IP address and the request time stamp, the requests differ in the micro-sense. So, isolating the static and the dynamic part of the request, the comparison can be made easy, if we are defining the request digest as a hash of static part alone). A request digest is created by discarding the static part of the request, and then applying a hash function on the rest of the network data that represent the request. A request digest is stored in the milestone data structures in the request processing path. The request digest is used for comparing with other in-flight requests, by making a direct binary comparison. A request digest is interpreted as an encoded binary representative of a request. This is directly comparable with another digest. If they match, the dynamic part of the late-coming request is augmented with the expanded form of the request, to re-create the original request. In this example, the conversion of fast-tracked requests 308a, b, c into the hash digest 312 includes: (i) digesting the plurality of fast-tracked requests into a hash; and (ii) stripping off dynamic aspects in the fast-tracked requests.

Processing proceeds to operation S270, where comparison mod 314 compares the fast-tracked requests of the plurality of fast-tracked requests using hash digest 312 for performing fast-tracking and long-jumping.

Figure 4:
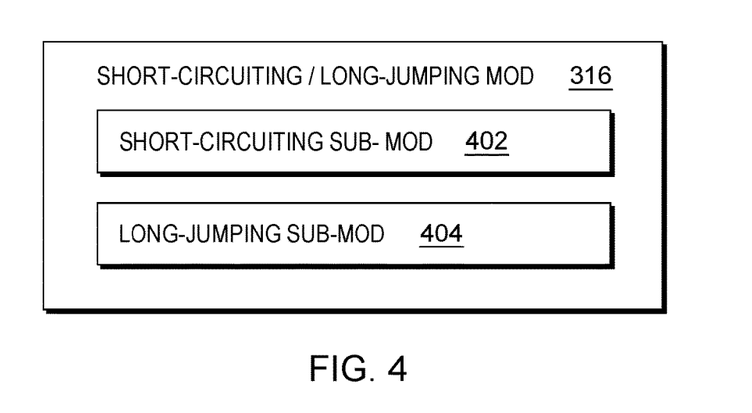
FIG. 4 is a screenshot view generated by the first embodiment system.

Processing proceeds to operation S275, wherein short-circuiting/long-jumping mod 316: (i) performs short-circuiting a current activity using hash digest 312 (see short-circuiting sub-mod 402 in FIG. 4); and (ii) long-jumping to a leading transaction that matches a current request type (see long-jumping sub-mod 404 in FIG. 4). In this example, the current activity is a current parsing task. In this example, the long-jumping includes: long-jumping to another location in the code flow where the request is already parsed; and long-jumping to another location in the code flow where the request is about to be parsed.

III. Further Comments and/or Embodiments

Some embodiments of the present invention recognize the following facts, potential problems and/or potential areas for improvement with respect to the current state of the art: (i) requests carry protocol headers; (ii) parsing protocol headers incur constantly and include substantial computation; (iii) in micro-service architectures, a service mostly caters to one type of request; (iv) services hosted on computer systems experiencing an event driven runtime will typically need to run a highly concurrent workload; (v) in such computer systems, there will be, at a given point during runtime, incoming requests at various stages of request processing; and/or (vi) responsiveness improves if new requests are fast-tracked with matching in-flight requests.

Some embodiments of the present invention may include one, or more, of the following operations, features, characteristics and/or advantages: (i) performs fast-tracking web requests with an http request digest in an event driven runtime; (ii) fast-tracking is performed by short-circuiting the current request parsing task and long-jumping to another location in the code flow where the request is already parsed, or about to be parsed; (iii) comparing requests is achieved by digesting requests into a hash; (iv) the comparison is made possible by stripping off dynamic aspects in the requests, such as a remote host IP (internet protocol), time stamp, etc.; (v) the long-jump is achieved by defining contexts and milestones in the process of parsing; and/or (vi) new requests switch to an appropriate milestone based on matching the contexts.

Figure 5:
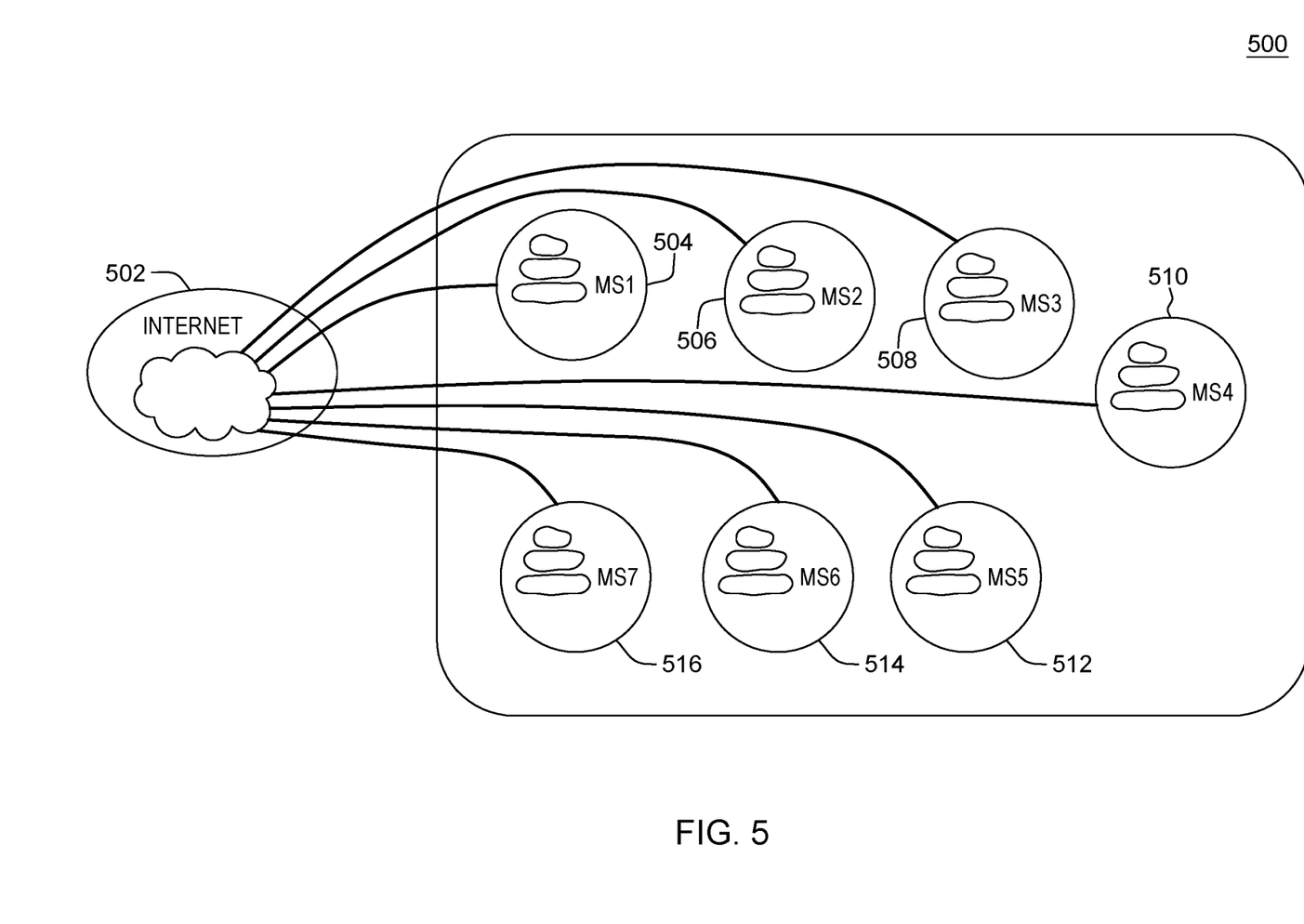
FIG. 5 is a first diagram of a second embodiment of a system according to the present invention.

FIG. 5, Diagram 500 shows various client requests at different milestone points in a service and includes: internet block 502; MS1 block 504; MS2 block 506; MS3 block 508; MS4 block 510; MS5 block 512; MS6 block 514; and MS7 block 516.

Figure 6:
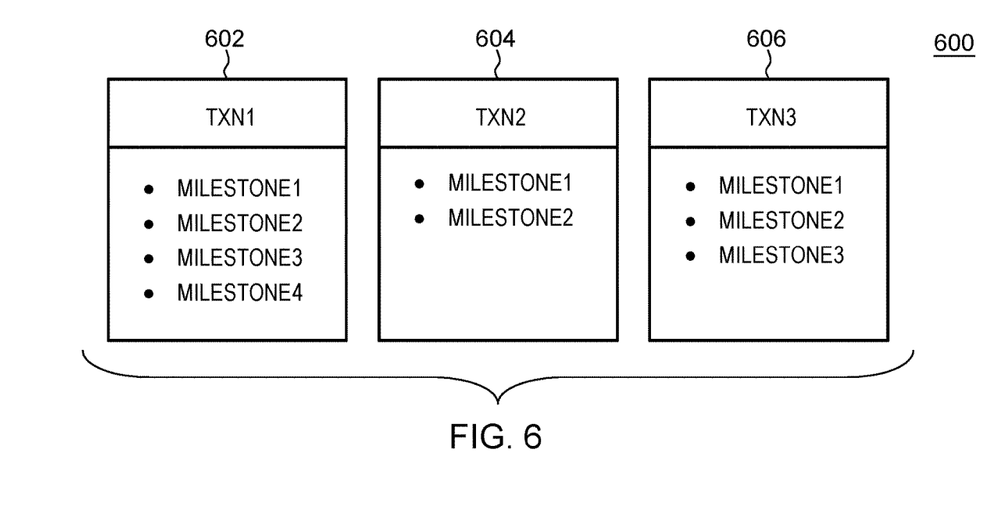
FIG. 6 is a second diagram of a second embodiment of a system according to the present invention.

FIG. 6, Diagram 600 shows global lists that contain current transactions and includes: txn1 block 602 (with milestones 1, 2 and 3); txn2 block 604 (with milestones 1 and 2): and txn3 block 606 (with milestones 1, 2, and 3).

Figure 7:
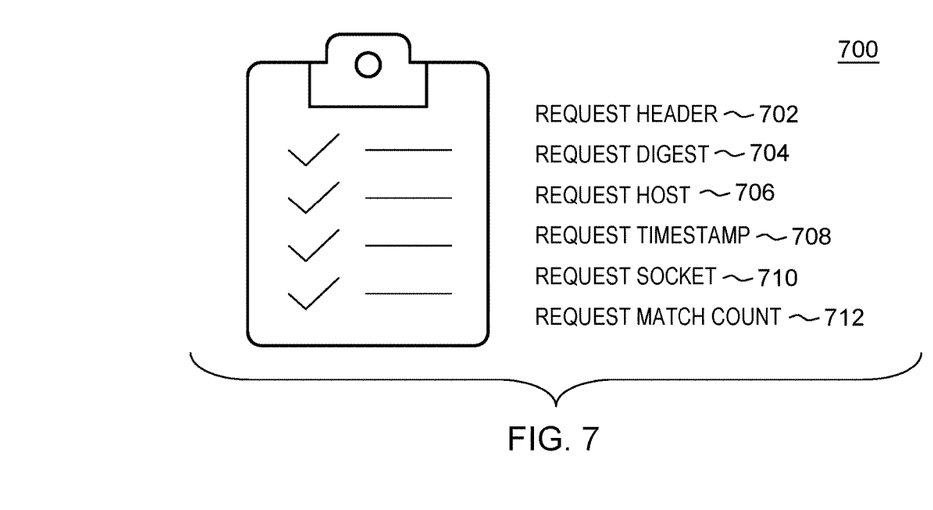
FIG. 7 is a third diagram of a second embodiment of a system according to the present invention.

FIG. 7, Diagram 700 shows a data structure that contains a http digest related data and includes: request header 702; request digest 704; request host 706; request timestamp 708; request socket 710, and request match count 712.

A method according to an embodiment of the present invention includes the following operations (not necessarily in the following order): (i) at the beginning of parsing, the request header is searched for dynamic data; (ii) dynamic data is anything that alters a digest, such as the IP address, time stamp, etc.; (iii) the dynamic data is stripped off from the header for later inclusion; (iv) the modified header is encoded through a hashing algorithm to create a simple digest; (v) a data structure is created with the original header, the digest, and the stripped off portions as the fields; (vi) the list of milestones is enumerated for a matching digest with the current one; (vii) if a match is found, the execution context is switched to the one that is stored in the matching entry in the list; (viii) if a match is not found, an entry is appended to the global list of the current transactions and the parsing continues as normal; (ix) at regular, predefined control flow points, the milestone data and the execution context is updated in the global list; and (x) if a digest was not visited for a predefined number of times, purge the record.

Some embodiments of the present invention may include one, or more, of the following operations, features, characteristics and/or advantages: (i) web responsiveness is critical to the performance of a number of critical business applications; (ii) while many optimizations are present in various facets of the request—response transactional route, http parsing is a key area that consumes a lot of computational intense work due to the heavy protocol semantics as well as security considerations; and/or (iii) if the heuristics of parsing can be reused in an intelligent and meaningful manner without compromising on security, that will substantially improve the overall web application responsiveness.

A method according to an embodiment of the present invention for fast-tracking web requests with a http request digest in an event driven runtime includes the following operations (not necessarily in the following order): (i) fast-tracking is achieved by short-circuiting the http parsing, partially or fully; (ii) fast-tracking is achieved by re-using execution context of a leading transaction; (iii) a leading transaction is identified by enumerating in a list of pending transactions; (iv) the leading transaction is identified by finding a match for the request digest; (v) the request digest is computed by the generic components of the request header; (vi) re-using the execution context is leveraging milestones by leading transactions, and (vii) the milestone data contain fully parsed requests as well as other contextual data.

Some embodiments of the present invention may include one, or more, of the following operations, features, characteristics and/or advantages: (i) includes front-end (as opposed to backend) in terms of operating space; (ii) includes pre-fetching requests versus short-circuiting concurrent requests in terms of method; (iii) includes identifying future requests versus identifying leading transactions in terms of method; (iv) performs fast-tracking of a request which has a similar request that has already passed the current milestone, thereby bypassing most of the parsing activities that were already performed; (v) focusses on how to eliminate some of the redundant steps for data transport, when there are leading transactions of a similar kind for the current one to follow; (vi) there is no difference in the external behavior with respect to the request as well as the response; and/or (vii) improves the overall responsiveness while being fully transparent to the interfaces.

Some embodiments of the present invention may include one, or more, of the following operations, features, characteristics and/or advantages: (i) includes fast-tracking requests; (ii) includes short-circuiting the current activity; (iii) includes long-jumping to a leading transaction that matches the current request type; (iv) compares requests by converting them into a hash digest; and/or (v) uses the digest for performing fast-tracking and long-jumping.

Some embodiments of the present invention provide for fast-tracking of web requests which typically occur at run-time, as any operation on a web request is exclusively carried out by the run-time of the transaction, as those of skill in the art will appreciate. "Runtime" is hereby defined as a state in the lifecycle of request transactions. "Event-driven runtime" herein refers to a specific execution environment.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving, from a first requester computer, a first request for a first microservice;
stripping a plurality of dynamic aspects from the first request, with the dynamic aspects including a remote host internet protocol and a timestamp;
converting the first request into a first-request hash digest;
parsing the first request to obtain a parsed version of the first request;
storing the first parsed request at a first location in a code flow;
receiving, from a second requester computer, a second request for the first microservice to be performed on behalf of the second requester computer;
stripping a plurality of dynamic aspects from the second request, with the dynamic aspects including a remote host internet protocol and a timestamp;
converting the second request into a second-request hash digest;
comparing the first-request hash digest with the second request hash digest to determine that the first request is identical to the second request outside of their respective dynamic aspects;
responsive to the determination that the first and second requests are identical, fast-tracking the second request by retrieving the first parsed request from the first location in the code flow; and
performing the second request using the first parsed version of the first request retrieved from the first location in the code flow.

2. The CIM of claim 1 further comprising:
defining a control flow point; and
determining that the control flow point has been reached;
responsive to the determination that the control flow point has been reached, updating milestone data in a global list; and
further responsive to the determination that the control flow point has been reached, updating execution context data in the global list.

3. A computer program product (CPP) comprising:
a set of non-transitory storage device(s); and
computer code stored collectively in the set of non-transitory storage device(s), with the computer code including data and instructions to cause a processor(s) set to perform at least the following operations:
receiving, from a first requester computer, a first request for a first microservice,
stripping a plurality of dynamic aspects from the first request, with the dynamic aspects including a remote host internet protocol and a timestamp,
converting the first request into a first-request hash digest,
parsing the first request to obtain a parsed version of the first request,
storing the first parsed request at a first location in a code flow,
receiving, from a second requester computer, a second request for the first microservice to be performed on behalf of the second requester computer,
stripping a plurality of dynamic aspects from the second request, with the dynamic aspects including a remote host internet protocol and a timestamp,
converting the second request into a second-request hash digest,
comparing the first-request hash digest with the second request hash digest to determine that the first request is identical to the second request outside of their respective dynamic aspects,
responsive to the determination that the first and second requests are identical, fast-tracking the second request by retrieving the first parsed request from the first location in the code flow, and
performing the second request using the first parsed version of the first request retrieved from the first location in the code flow.

4. The CPP of claim 3 wherein the computer code further includes instructions for causing the processor(s) set to perform the following operation(s):
defining a control flow point; and
determining that the control flow point has been reached;
responsive to the determination that the control flow point has been reached, updating milestone data in a global list; and further responsive to the determination that the control flow point has been reached, updating execution context data in the global list.

5. A computer system (CS) comprising:
a processor(s) set;
a set of storage device(s); and
computer code stored collectively in the set of storage device(s), with the computer code including data and instructions to cause the processor(s) set to perform at least the following operations:
  receiving, from a first requester computer, a first request for a first microservice,
  stripping a plurality of dynamic aspects from the first request, with the dynamic aspects including a remote host internet protocol and a timestamp,
  converting the first request into a first-request hash digest,
  parsing the first request to obtain a parsed version of the first request,
  storing the first parsed request at a first location in a code flow,
  receiving, from a second requester computer, a second request for the first microservice to be performed on behalf of the second requester computer,
  stripping a plurality of dynamic aspects from the second request, with the dynamic aspects including a remote host internet protocol and a timestamp,
  converting the second request into a second-request hash digest,
  comparing the first-request hash digest with the second request hash digest to determine that the first request is identical to the second request outside of their respective dynamic aspects,
  responsive to the determination that the first and second requests are identical, fast-tracking the second request by retrieving the first parsed request from the first location in the code flow, and
  performing the second request using the first parsed version of the first request retrieved from the first location in the code flow.

6. The CS of claim 5 wherein the computer code further includes instructions for causing the processor(s) set to perform the following operation(s):
  defining a control flow point; and
  determining that the control flow point has been reached;
  responsive to the determination that the control flow point has been reached, updating milestone data in a global list; and
  further responsive to the determination that the control flow point has been reached, updating execution context data in the global list.

* * * * *